INVENTOR
GERARDUS C. VAN DE MEERENDONK
ATTORNEYS

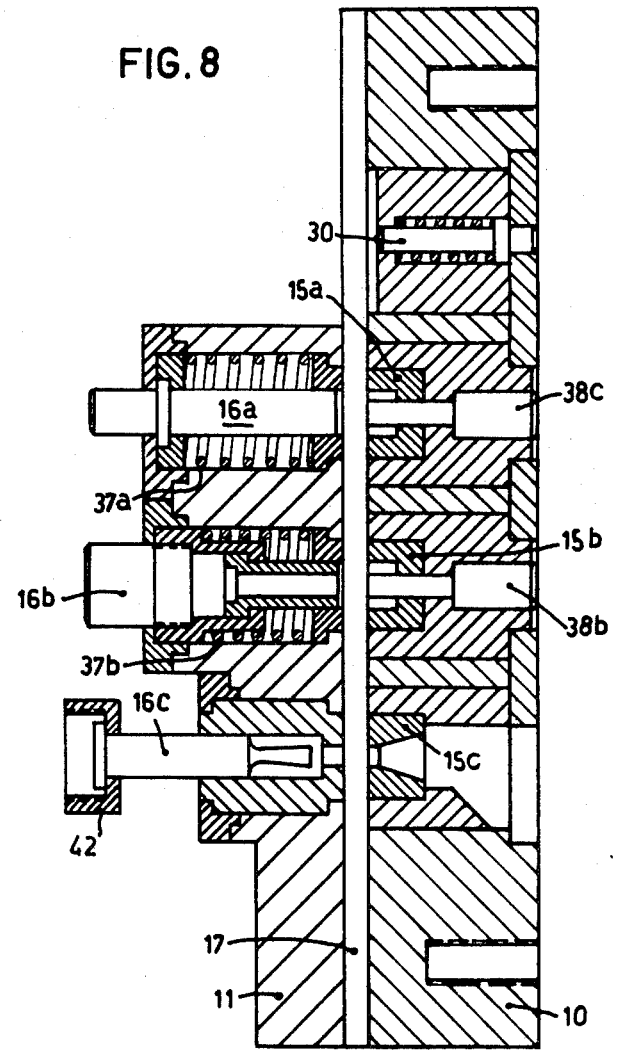

United States Patent Office 3,583,013
Patented June 8, 1971

3,583,013
DEVICE FOR PRESSING NUTS AND THE LIKE
Gerardus C. van de Meerendonk, Helmond, Netherlands, assignor to Nedschroef Octrooi Maatschappij N.V., Helmond, Netherlands
Filed Sept. 17, 1968, Ser. No. 760,150
Claims priority, application Netherlands, Sept. 18, 1967, 6712706
Int. Cl. B21d 53/24; B21k 1/64
U.S. Cl. 10—76                                      9 Claims

ABSTRACT OF THE DISCLOSURE

The machine for forming nut blanks and the like articles or objects includes a frame, a reciprocable carriage mounted in the frame and a tool block member provided with both punching means and dies removably mounted in the frame for cooperation with the reciprocation of the carriage. The tool block member is releasably secured in the frame and readily removable for replacement in the frame by a new tool block member and for replacement of any of its parts, including the punching means and dies.

---

The invention relates to a device or machine for pressing with great speed nuts or nut blanks and similar objects, comprising a reciprocable carriage, punching means or similar tools, which are adapted to cooperate with opposed dies or similar tools by reciprocation of said carriage, means for ejecting formed objects from said dies and a mechanism for transferring said objects from one tool to the other.

In such devices operation with great speed is economically very important so that loss of time for readjustment and replacement of the tools is as short as possible.

In the machines known so far the various dies or similar tools are mostly mounted in a holder fixed in the frame of the machine and the various punching means are mounted in a holder fixed in the reciprocable carriage. Additionally the mechanism for transferring the objects to be formed from one tool to another is mounted on top of said tools.

Much time is lost when each die or punching means has to be removed separately and replaced if they are damaged or the like. Also the mechanism for transferring the object must be removed.

In order to avoid said disadvantages in the device according to the invention the punching means or similar tools and the dies or similar tools are arranged together in one, e.g. block-shaped member, that can be removed from the device as a unit.

In an embodiment of the device according to the invention the block-shaped member comprising the punching means or the like, and the dies or the like, consists of a front portion, containing the punching means or the like and a back portion, containing the dies and the like, said front- and back-portions being adapted to be attached to each other in an immovable way.

In order to be able during a possible replacement of the dies and the punching means to remove the mechanism for transferring the objects to be formed in an easy way in an embodiment of the device according to the invention said mechanism is connected with the block shaped member of the punching means and the dies.

An embodiment of the device according to the invention will be described with reference to the drawing and by way of example.

FIG. 8 shows a horizontal section of the removed tool block.

Figure 1:
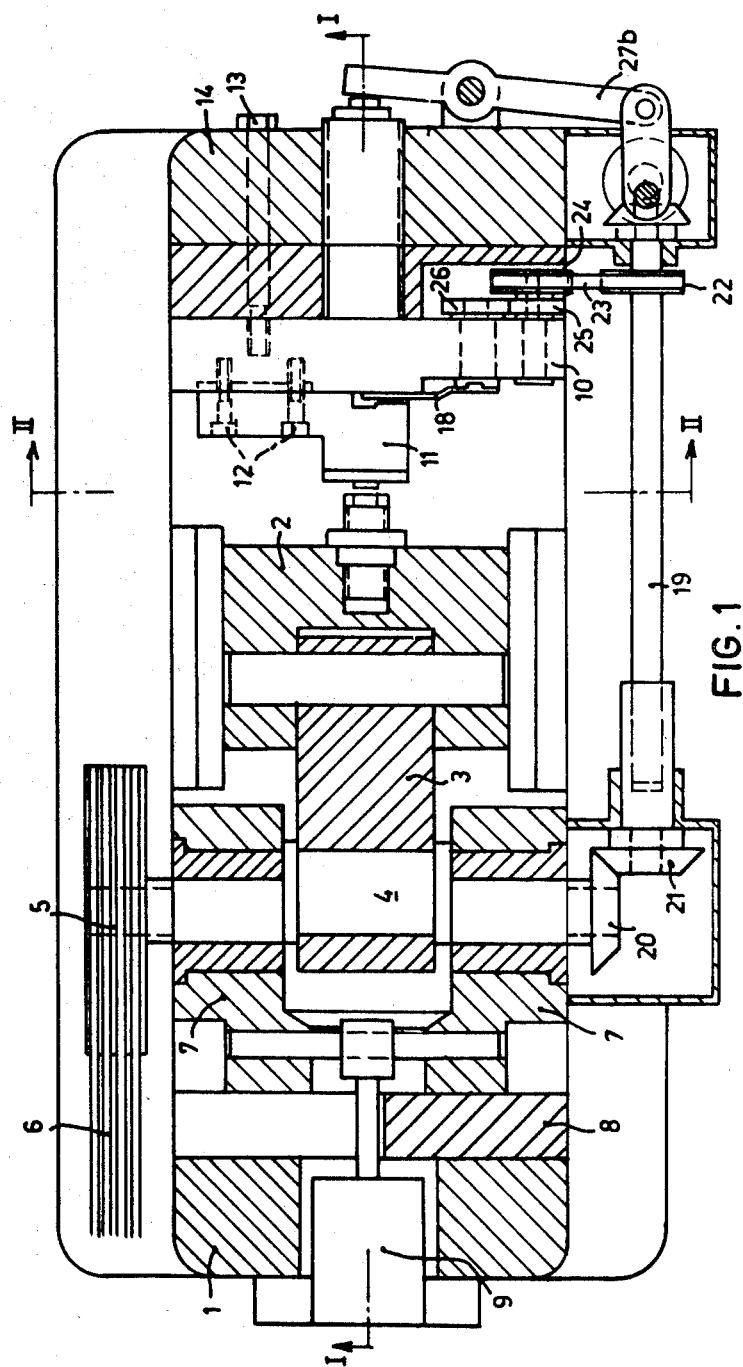
FIG. 1 shows a horizontal section of the device.

In the frame 1 of the device the carriage 2 makes a relatively short reciprocating movement via the connecting rod 3 and the crankshaft 4. The crankshaft is rotated via the flywheel 5 and the drive 6 by a motor not shown.

The crankshaft 4 has bearings in the housing that can be shifted in the frame 1 and normally is forced against a removable plate by means of a tension device 9. Opposite the carriage 2 the closed tool block member is arranged, said tool block member consisting of a back portion 10 and a front portion 11, said portions being connected with each other by means of bolts 12. The complete block is forced against the back plate 14 attached to the frame by means of bolts 13.

Figure 2:
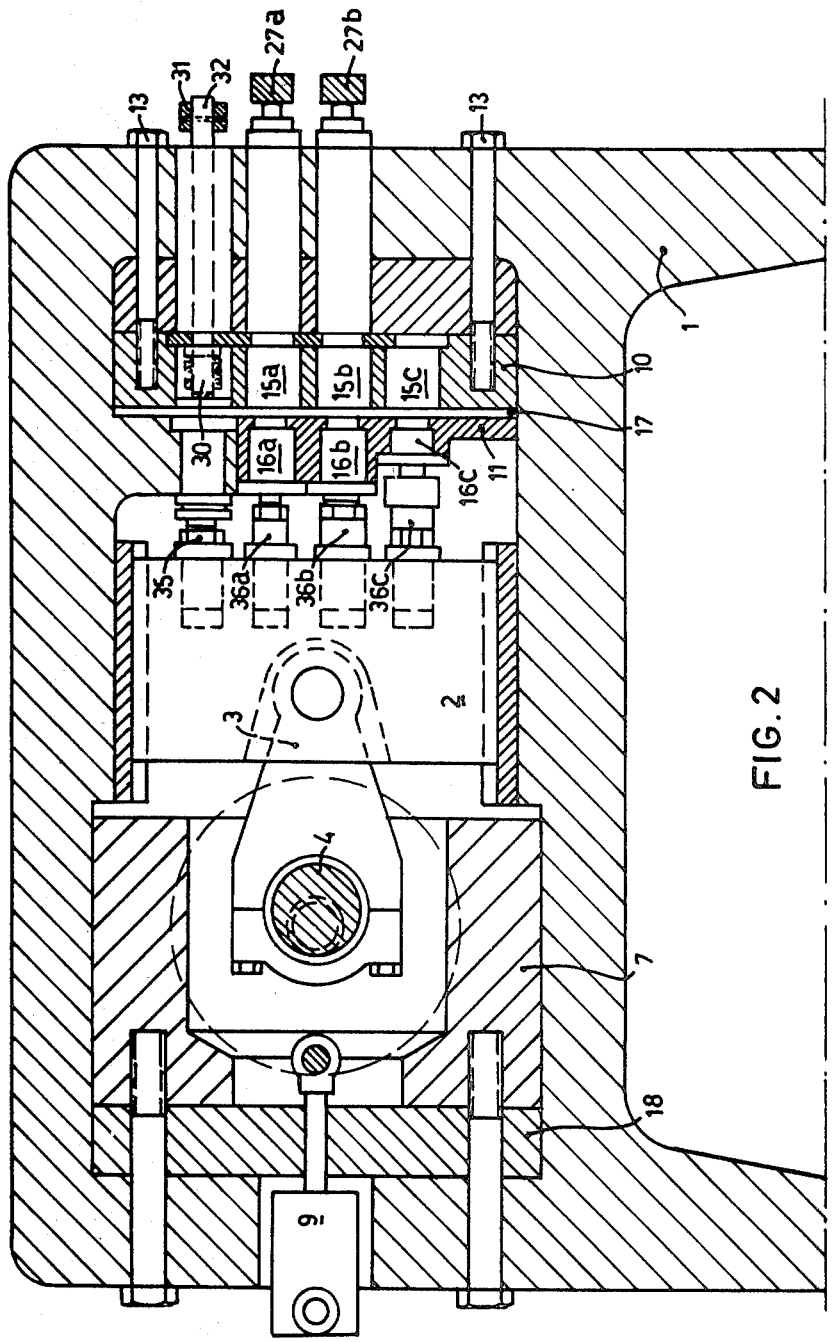
FIG. 2 shows a vertical section according to the line I—I in FIG. 1.

The various dies 15a–15b–15c are arranged in the back portion 10 of the tool block, the various punching means 16a, 16b, 16c being arranged in the front portion 11, as shown in FIG. 2.

Figure 3:
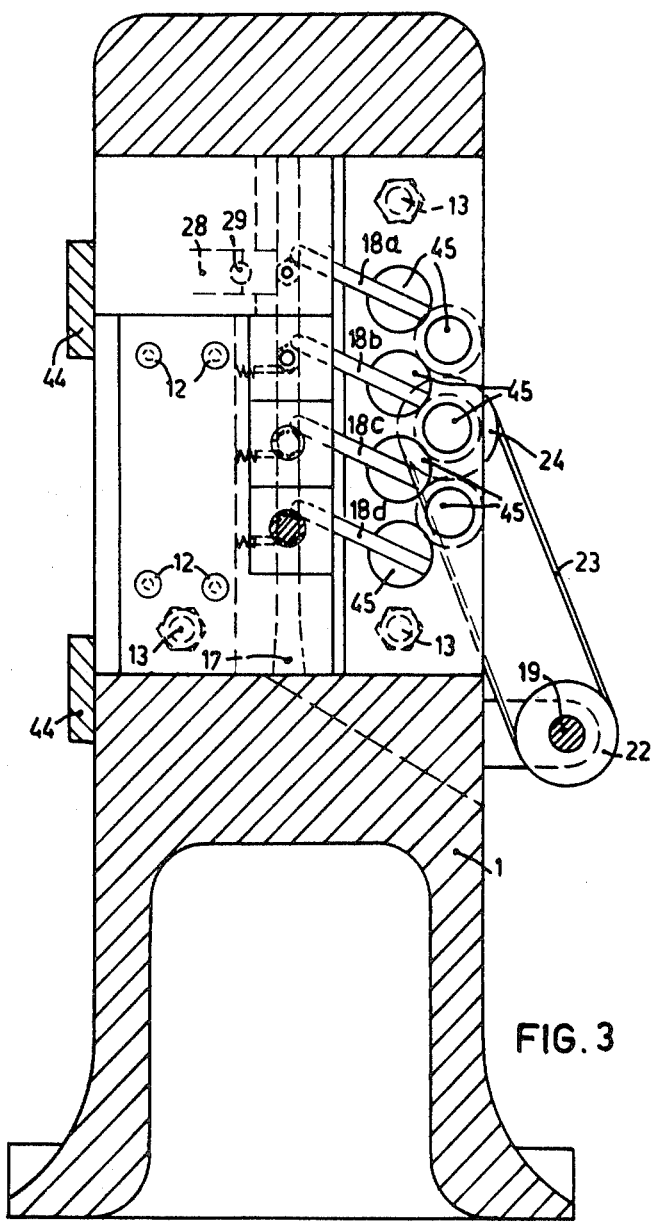
FIG. 3 shows a section acccording to the line II—II in FIG. 1.

The transfer of the objects to be formed from one station to the other (i.e. from one die to the next one) takes place in the guiding means 17 (FIG. 3) arranged in the front portion 11 of the tool block by means of continuously rotating fingers 18a, 18b, 18c, 18d of a mechanism for transferring the objects to be formed from one tool to the next one, said fingers being interconnected by gears 45.

Since the movement of said fingers 18a, 18b, 18c, 18d must synchronize with the reciprocating movement of the carriage 2, said movement is derived from the crankshaft 4 via a lateral shaft 19, which receives its rotation from the crankshaft 4 by means of the bevel wheels 20 and 21 (FIG. 1). The sprocket 22 is arranged on the lateral shaft 19. Said sprocket 22 rotates the sprocket 24 through the chain 23, said sprocket giving a rotation to the fingers 18a, 18b, 18c, 18d through the gears 25 and 26.

Also the movement of the ejecting arms 27a, 27b (FIGS. 1, 2, 4 and 5) is derived from the same lateral shaft 19, said ejecting arms providing the ejection of the objects from the dies 15a, 15b. The starting material or workpiece being guided into the device by a known manner, said material is cut to a predetermined length by a blade 28 (FIG. 3), said blade 28 moving a piece of material 29 that has been cut off to the first forming station in which a pre-punching pin 30 (FIG. 4) receiving its movement from a rod 32 reciprocated by the arm 31 prepunches said piece lightly in a die 33 fixed in the frame opposite the other dies and above the tool block portion 11.

The object being ejected from the die 33 by the ejecting pin 34 through the action of the member 35 fixed in the carriage, is transported to the next station by the finger 18a, through the guiding means 17.

The object is pressed subsequently by the punching means 16a, 16b into the dies 15a, 15b, said punching means receiving their reciprocating movement from the pressing means 36a, 36b fixed in the carriage, the returning movement taking place through compression springs 37a, 37b. See FIGS. 4 and 8. The object is ejected from the dies by means of short ejecting pins 38a, 38b arranged in the tool block 10 and receiving their movement through the intermediate pins 39a, 39b from the long ejecting pins 40a, 40b arranged in the frame 1 and moved by the ejecting arms 27a, 27b. In the last station 15c, 16c the hole is punched into the object by means of the punching means 16c in the die 15c, said punching means 16c being coupled to the pressing means 36c by means of a coupling nut 42. During the return movement of the punching means 16a–16b by means of the springs 37a–37b the punching means 16c is also returned by the carriage 2.

Then the punched nut blank is pressed downwardly in the space 17 by the finger 18d where said nut leaves the device.

Figure 4:
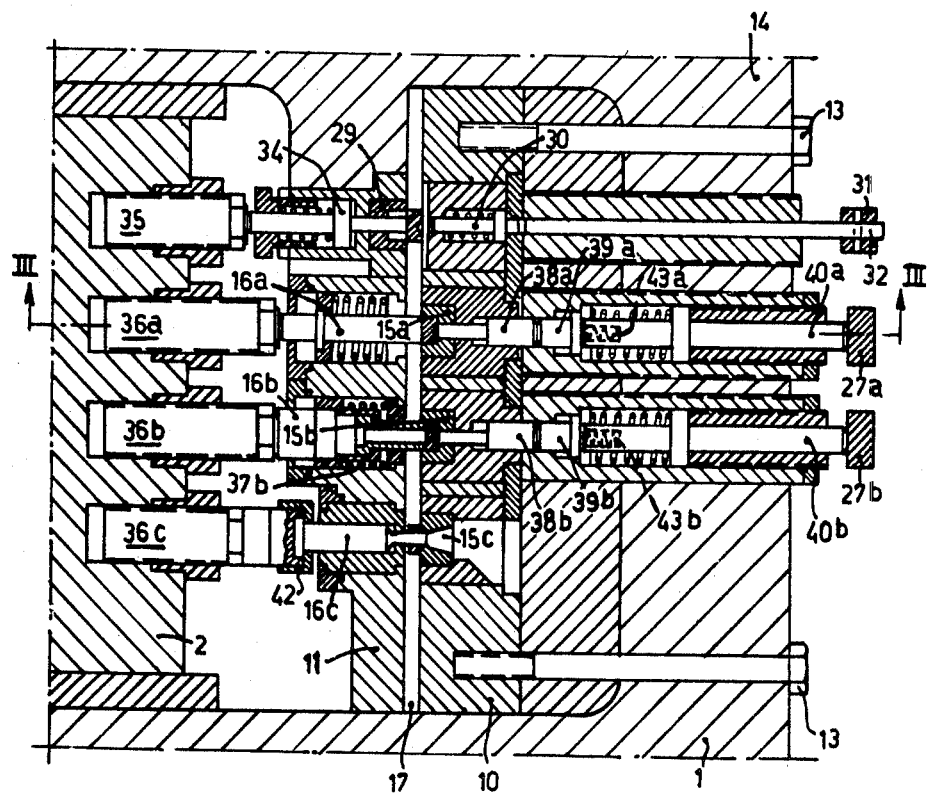
FIG. 4 shows a vertical section on enlarged scale over the tools in their most forward position.
Figure 5:
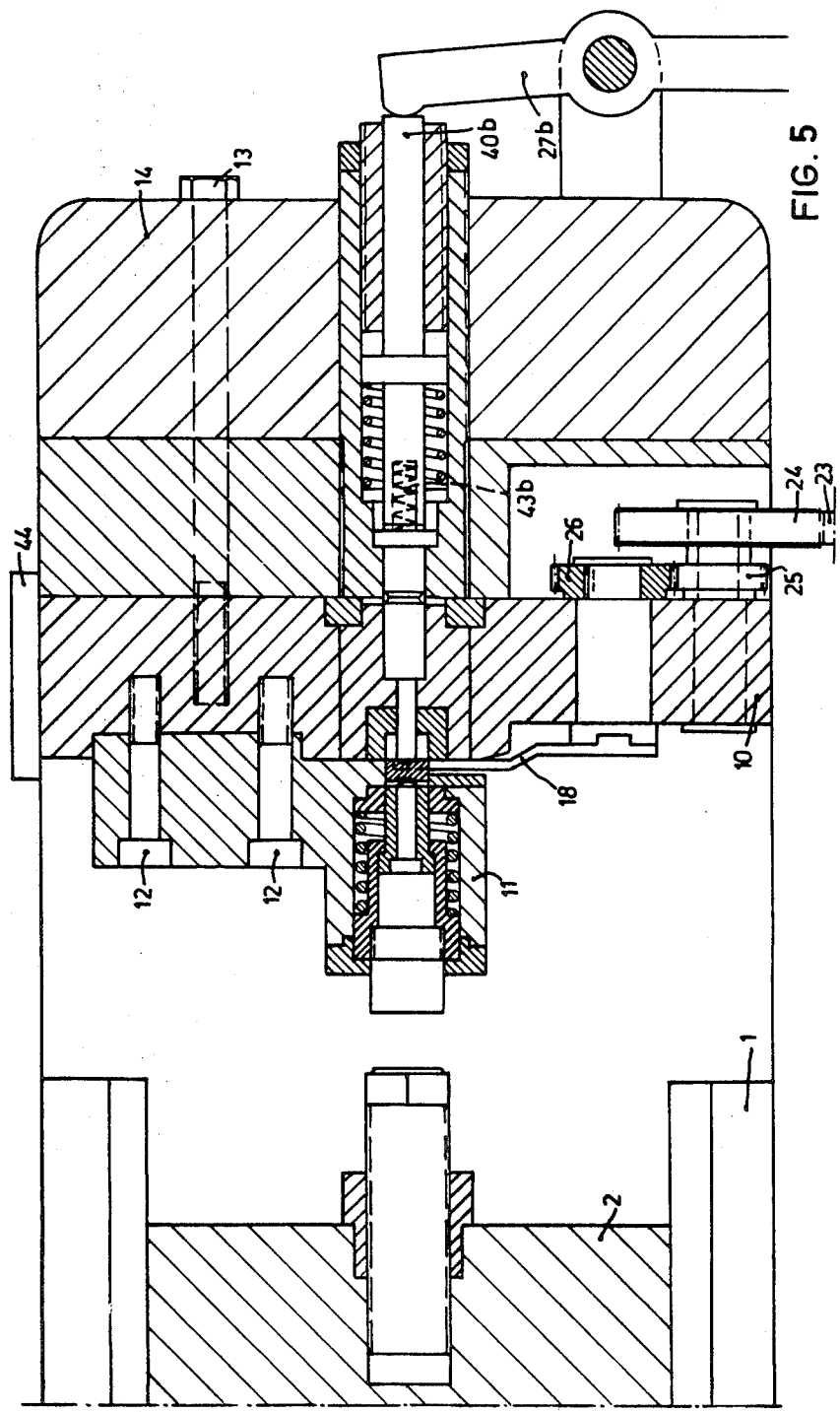
FIG. 5 shows a section according to the line III—III in FIG. 4 the carriage being in its backward position.
Figure 6:
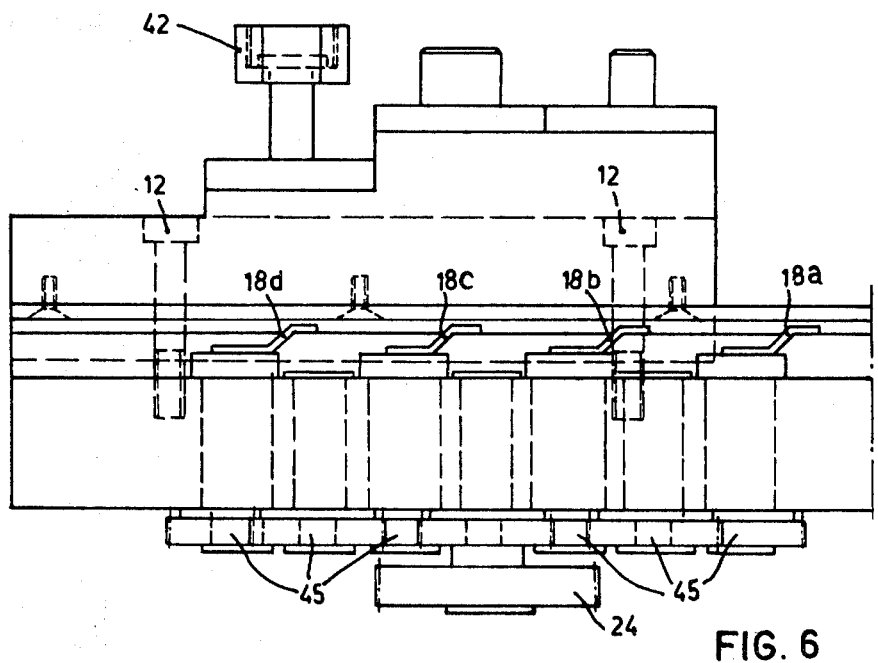
FIG. 6 shows a plan view of the removed tool block.
Figure 7:
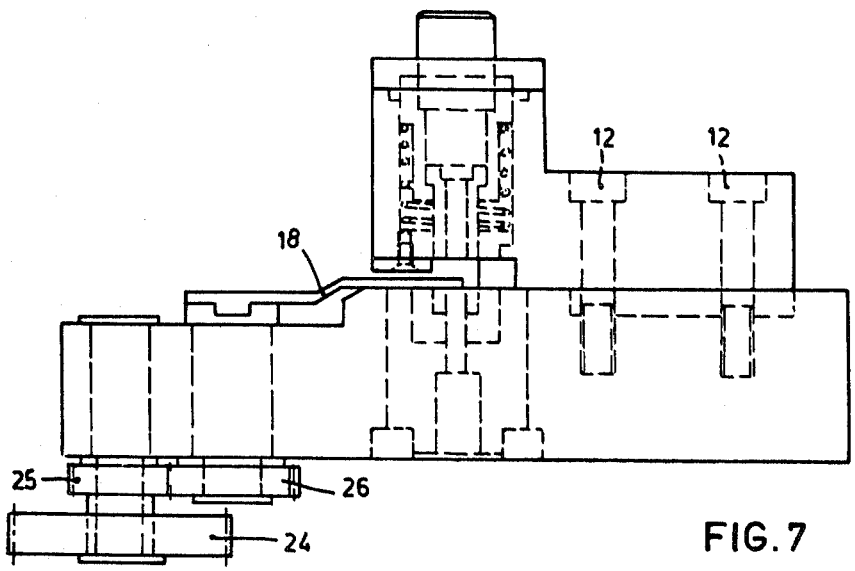
FIG. 7 shows an elevation of a removed tool block.

If the tool must be replaced for some reason all tools can be taken away as a unit removing the tool block 10, 11 from the device, which is possible after the bolts 13 are released and the punching means is disconnected from the pressing means 36c by releasing the coupling nut 42. The springs 43a, 43b take care that the ejecting pins 38a, 38b are always in their most forward position so that they can pass along the front side of the fixed back, plate 14, as indicated in FIGS. 4, 5 and 8. Furthermore, it is observed that if the tool block is removed from the machine the driving chain 23 of the finger motion is slackened automatically so that same can remove readily from the sprocket 24. After the removal of the old tool block a new identical tool block that has been prepared and completely adjusted previously can be positioned so that the machine can be used again after a very short period of time, the abutments 44 taking care that the new block always is in its accurate position. Then the removed tool block can be provided with new tools by releasing the screw bolts 12 by which the two portions 10 and 11 are interconnected so that said block is ready for further use.

What is claimed is:

1. In a machine for forming nuts and the like articles including a frame, a reciprocable carriage mounted in the frame, dies or the like tools mounted in a block in the frame, punching means or the like tools mounted opposite the dies and adapted to cooperate therewith by the reciprocation of said carriage, the improvement wherein the dies and punching means are arranged together in a tool block member, said tool block member together with the dies and punching means being readily removable from the frame as a unit for replacement in the frame by a new unit and for replacement of any of its parts including the punching means and dies, and means for releasably securing said block-shaped member in the frame in a position in which the punching means is adapted to be acted on by the reciprocable carriage.

2. A machine as claimed in claim 1, wherein the punching means and the dies of the tool block member are arranged to provide a series of forming stations through which a workpiece is moved, and a transfer mechanism carried by the tool block member for moving the workpieces in succession through said stations.

3. A machine as claimed in claim 2, wherein the tool block member comprises a front portion in which the punching means are mounted and a back portion in which the dies are mounted, and means for mounting said transfer mechanism on the back portion of the tool block member.

4. A machine as claimed in claim 1, wherein the tool block member comprises a front portion in which the punching means are mounted and a back portion in which the dies are mounted, means for immovably attaching said portions to each other in a manner to form a closed tool member in which the portions are immovable with respect to each other under the operating conditions of the machine.

5. A machine as claimed in claim 4, wherein said portions are spaced apart where the punching means face the respective dies to provide a transfer guide means for workpieces.

6. A machine as claimed in claim 5, including a transfer mechanism mounted on the back portion having fingers operating in the space forming the transfer guide means between said tool block member portions.

7. A machine as claimed in claim 1, wherein the carriage is provided with spring-biased pressing means arranged to press against the respective punching means during the operation of the machine.

8. A machine as claimed in claim 2, wherein the punching means of the final station of the series is connected with a pressing means on the carriage by a coupling member which is readily releasable when the tool block member is to be removed from the frame.

9. A machine as claimed in claim 2, wherein the series of stations are arranged one below the other and the forming operation is carried out from top to bottom of the stations.

References Cited
UNITED STATES PATENTS

| | | | |
|---|---|---|---|
| 1,892,445 | 12/1932 | Burbank | 10—12 |
| 1,935,742 | 11/1933 | Hager | 10—12 |
| 1,980,653 | 11/1934 | Wilcox | 10—12.5 |
| 2,120,649 | 6/1938 | Rosenberg | 10—12.5 |
| 2,275,665 | 3/1942 | Wilcox | 10—12.5 |
| 3,188,849 | 6/1965 | Wisebaker et al. | 10—12 |
| 3,274,626 | 9/1966 | Van de Meerendonk | 10—12 |

RICHARD J. HERBST, Primary Examiner

E. M. COMBS, Assistant Examiner